United States Patent
Shi et al.

(10) Patent No.: US 12,277,146 B2
(45) Date of Patent: Apr. 15, 2025

(54) METHOD FOR UPDATING INFORMATION OF POINT OF INTEREST, ELECTRONIC DEVICE AND STORAGE MEDIUM

(71) Applicant: Beijing Baidu Netcom Science Technology Co., Ltd., Beijing (CN)

(72) Inventors: Yingchao Shi, Beijing (CN); Jizhou Huang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 218 days.

(21) Appl. No.: 17/844,975

(22) Filed: Jun. 21, 2022

(65) Prior Publication Data
US 2022/0327147 A1    Oct. 13, 2022

(30) Foreign Application Priority Data
Jun. 22, 2021 (CN) .......................... 202110693601.5

(51) Int. Cl.
*G06F 16/00* (2019.01)
*G06F 16/29* (2019.01)

(52) U.S. Cl.
CPC .................... *G06F 16/29* (2019.01)

(58) Field of Classification Search
CPC .............................. G06F 16/29; G06F 16/9537
See application file for complete search history.

(56) References Cited

U.S. PATENT DOCUMENTS

| | | | | |
|---|---|---|---|---|
| 2013/0007011 | A1* | 1/2013 | Setlur | G06F 16/24575 |
| | | | | 707/E17.084 |
| 2014/0074610 | A1* | 3/2014 | Bilange | G06Q 50/01 |
| | | | | 705/14.58 |
| 2016/0034493 | A1* | 2/2016 | Starns | G06F 16/215 |
| | | | | 707/690 |

FOREIGN PATENT DOCUMENTS

| | | |
|---|---|---|
| CN | 101751396 A | 6/2010 |
| CN | 104620272 A | 5/2015 |
| CN | 105808627 A | 7/2016 |
| CN | 109325091 A | 2/2019 |
| CN | 109727041 A * | 5/2019 |
| CN | 110232160 A | 9/2019 |
| CN | 111523031 A | 8/2020 |
| CN | 112052410 A | 12/2020 |

(Continued)

OTHER PUBLICATIONS

Official Communication issued in corresponding Chinese Patent Application No. 202110693601.5, mailed on May 10, 2023.

*Primary Examiner* — Dinku W Gebresenbet
(74) *Attorney, Agent, or Firm* — Keating & Bennett, LLP (57) ABSTRACT

There is provided a method for updating information of a point of interest, an electronic device and a storage medium, relating to the field of artificial intelligence, in particular to the field of information intelligent search, and being applicable to a scene for identifying a specified type of text content. The method includes identifying a user focus information to be approved for a target point of interest from at least one user-generated content; constructing an approval request information for approving the user focus information; pushing the approval request information to an operator of the target point of interest and obtaining an approval result information for the user focus information from the operator; and updating an attribute information of the target (Continued)

point of interest according to the approval result information.

6 Claims, 4 Drawing Sheets

(56) References Cited

FOREIGN PATENT DOCUMENTS

| | | | |
|---|---|---|---|
| CN | 109325091 B | * | 2/2021 |
| CN | 112487313 A | | 3/2021 |

* cited by examiner

METHOD FOR UPDATING INFORMATION OF POINT OF INTEREST, ELECTRONIC DEVICE AND STORAGE MEDIUM

CROSS-REFERENCE TO RELATED APPLICATIONS

This application is claims priority to Chinese Application No. 202110693601.5 filed on Jun. 22, 2021, which is incorporated herein by reference in its entirety.

TECHNICAL FIELD

The present disclosure relates to the field of artificial intelligence, and in particular to the field of information intelligent search.

BACKGROUND

Point of interest (POI) generally refers to any geographical object that may be abstracted as a point, especially geographical entities closely related to lives of people, such as schools, banks, restaurants, hospitals, supermarkets, etc. In order to improve an information accuracy of the point of interest, it is necessary to approve an attribute information of the existing point of interest.

However, at present, only fixed attribute information, such as name, coordinates, category, and phone number, of the point of interest may be approved. However, the information about the point of interest that users want to know is diverse, and it is difficult to exhaust all the possible personalized attribute information of the point of interest in advance. Therefore, the above-mentioned personalized attribute information is unable to be updated timely in the related art.

SUMMARY

The present disclosure provides a method for updating information of a point of interest, an electronic device and a storage medium According to one aspect of the present disclosure, a method for updating information of a point of interest is provided, including:
identifying a user focus information to be approved for a target point of interest from at least one user-generated content;
constructing an approval request information for approving the user focus information;
pushing the approval request information to an operator of the target point of interest and obtaining an approval result information for the user focus information from the operator; and
updating an attribute information of the target point of interest according to the approval result information.

According to another aspect of the present disclosure, an electronic device is provided, including:
at least one processor; and
a memory communicatively connected with the at least one processor;
wherein the memory stores instructions executable by the at least one processor, and the instructions, when executed by the at least one processor, cause the at least one processor to execute the above described method for updating information of a point of interest.

According to another aspect of the present disclosure, a non-transitory computer-readable storage medium storing computer instructions is provided, wherein the computer instructions are configured to cause the computer to execute the above described method for updating information of a point of interest.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used for a better understanding of the solution, and do not constitute a limitation of the present disclosure. Wherein.

DETAILED DESCRIPTION OF EMBODIMENTS

The following describes exemplary embodiments of the present disclosure with reference to the drawings, which include various details of the embodiments of the present disclosure to facilitate understanding, and should be regarded as merely exemplary. Therefore, those skilled in the art should recognize that various changes and modifications may be made to the embodiments described herein without departing from the scope and spirit of the present disclosure. Likewise, for clarity and conciseness, descriptions of well-known functions and structures are omitted in the following description.

Point of interest (POI) generally refers to any geographical object that may be abstracted as a point, especially geographical entities closely related to lives of people, such as schools, banks, restaurants, hospitals, supermarkets, etc. In order to improve an information accuracy of the point of interest, it is desired to approve an attribute information of the existing point of interest.

However, at present, only fixed attribute information, such as name, coordinates, category, and phone number, of the point of interest may be approved. However, the information about the point of interest that users want to know is diverse. For example, the personalized attribute information about the point of interest that the user wants to know may include "whether pets are allowed", "Is it open on weekends?", "Whether free parking is available?", "Whether ticket is required?", "Is there any fever clinic?" etc. It may be seen that, it is difficult to exhaust all possible personalized attribute information of the point of interest in advance in practice. Since the above-mentioned personalized attribute information of the point of interest is not constructed in advance, it is difficult to approve and update the information timely, and thus it is difficult to provide accurate content of the personalized attribute information to the user.

A method for updating information of a point of interest, an electronic device and a storage medium provided by the embodiments of the present disclosure are intended.

Figure 1:
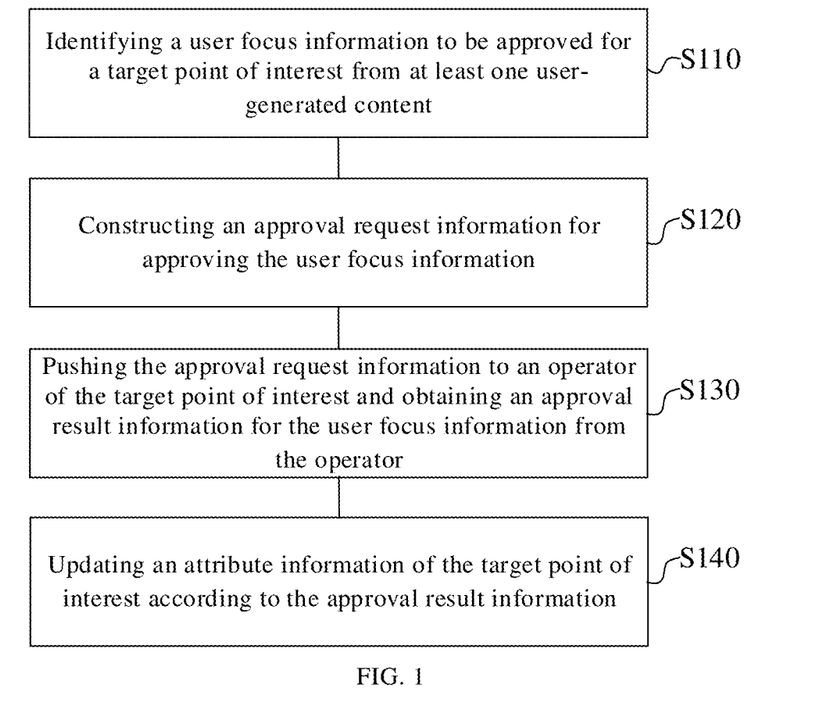
FIG. 1 illustrates a schematic flowchart of a method for updating information of a point of interest provided by the embodiments of the present disclosure.

FIG. 1 illustrates a schematic flowchart of a method for updating information of a point of interest provided by the embodiments of the present disclosure. As shown in FIG. 1, the method may mainly include the following steps.

S110: a user focus information to be approved for a target point of interest is identified from at least one user-generated content.

The user-generated content is an Internet term, and the abbreviation is UGC. The concept of user-generated content originated in the Internet field, that is, a user presents his/her own original content through the Internet platform or provide it to other users. The user-generated content may include a requirement focused by the user for the target point of interest. In the embodiments of the present disclosure, the user-generated content that includes the requirement focused by the user for the target point of interest is referred to as the user focus information for the target point of interest. Furthermore, since the user-generated content is not necessarily accurate, the user focus information identified in this step needs to be further approved in subsequent steps. Therefore, in this step, the user-generated content that includes the requirement focused by the user for the target point of interest is referred to as the user focus information to be approved for the target point of interest.

In order to improve the efficiency of identifying the user focus information to be approved for the target point of interest, at least one information source related to the target point of interest may be determined in advance to narrow the search scope. The at least one information source includes map applications, forums, user search logs, shopping applications and video applications. After at least one information source is determined, at least one user-generated content related to the target point of interest is obtained from the at least one information source.

Taking restaurant A as the target point of interest as an example, the user-generated content a1 for restaurant A is "Free parking is available for this restaurant", it may be predicted that the requirement focused by the user for restaurant A is "Whether free parking is available"; the user-generated content a2 is "This restaurant serves shows", and it may be predicted that the requirement focused by the user for restaurant A is "Whether shows are served". Both the user-generated content a1 and the user-generated content a2 mentioned above may be identified as the user focus information to be approved for the target point of interest.

As mentioned above, in the embodiments of the present disclosure, the user-generated content includes the requirement focused by the user for the target point of interest is referred to as the user focus information to be approved for the target point of interest; it may be understood that there are some user-generated contents that are regarded as the user focus information. Therefore, the user-generated content in the embodiments of the present disclosure includes a factual user-generated content and/or a subjective user-generated content. At least one of the user-generated contents may be input to a classification model, the factual user-generated content may be identified from the at least one of the user-generated contents based on the classification model, and the factual user-generated content may be determined as the user focus information to be approved for the target point of interest.

S120: an approval request information for approving the user focus information is constructed.

The content of the user focus information identified in the above steps is often difficult to understand and thus is not suitable to be directly used as a speech to communicate with an operator of the target point of interest. For example, the user focus information may be in the form of "Free parking is available at this hotel" or "You could watch a show while eating". If such original content is directly used to communicate with the operator of the target point of interest, it will be difficult for the operator to understand. At the same time, since a lot of user focus information may be mined for the target point of interest, manually approving the user focus information will cause a large labor cost. Therefore, according to the embodiments of the present disclosure, the approval request information for each user focus information may be constructed based on a preset speech format. For example, "Free parking is available at this hotel" and "You could watch a show while eating" are respectively constructed as the speech like "Is free parking available at your hotel?" and "Do you provide a show during dinner at your restrant?". After that, approving the use focus information with the operator of the target point of interest is performed by the machine by using the approval request information. Optionally, according to the embodiments of the present disclosure, an identity information of the target point of interest may be obtained, the identity information and the use focus information may be input to a request information generation model, and the approval request information for approving the user focus information may be generated based on the request information generation model. After that, approving the user focus information with the operator of the target point of interest may be performed by the machine by using the approval request information.

It may be understood that a plurality of user focus information for the identified target points of interest may have the same meaning. For example, "There are free parking spaces", "Free parking is available", "Parking is free", "Parking does not require to be paid", "Free parking", "There is a free parking lot" and "Parking does not charge money" all express the user's need for "Whether free parking is availabe?". For the plurality of user focus information with the same meaning, it is enough to approve and update just one of the user focus information, in order to avoid repeated approval of the user focus information with the same meaning, thereby saving resources.

In view of the above, a focus information database may be established in advance according to the embodiments of the present disclosure. The focus information database contains at least one historical user focus information. The historical user focus information is the user focus information which has been identified. According to the embodiments of the present disclosure, it may be determined whether a user focus information is the same as each historical user focus information in the focus information database after the user focus information is identified. The approval request information for approving the user focus information is constructed in response to the user focus information is different from all the historical user focus information in the focus information database. It may be understood that if it is identified that the user focus information is the same as a historical user focus information in the focus information database, then the subsequent steps for the user focus information may be stopped.

S130: the approval request information is pushed to the operator of the target point of interest, and an approval result information for the user focus information is obtained from the operator.

In the embodiments of the present disclosure, the approval request information may be pushed to the operator of the target point of interest (such as the owner of a restaurant) through a variety of communication methods. For example, the approval request information may be pushed to the operator of the target point of interest via telephone call, text message, email or instant messaging software, and the approval result information for the user focus information may be obtained based on the feedback of the operator for the approval dialog. For example, the intelligent voice robot may be used to communicate with the operator of the target point of interest on the telephone call asking "Do you provide free parking?". After that if the operator's answer is yes, the approval result information may be "Free parking is available at the restaurant"; and if the operator's answer is no, the approval result information may be "Free parking is not available at the restaurant".

S140: an attribute information of the target point of interest is updated according to the approval result information.

In the embodiments of the present disclosure, the approval result information may be added as the new attribute information of the target point of interest, and stored in association with the target point of interest.

With the method for updating information of the point of interest provided by the embodiments of the present disclosure, the user focus information that the user cares about for the target point of interest may be accurately identified in the user-generated content on the Internet, and it is possible to automatically contact the operator of the target point of interest to approve and update the user focus information. In this way, it is possible to effectively construct various personalized attribute information of the target point of interest, such that the various attribute information about the target point of interest may be fully understood by the user, and the user experience may be improved.

Figure 2:
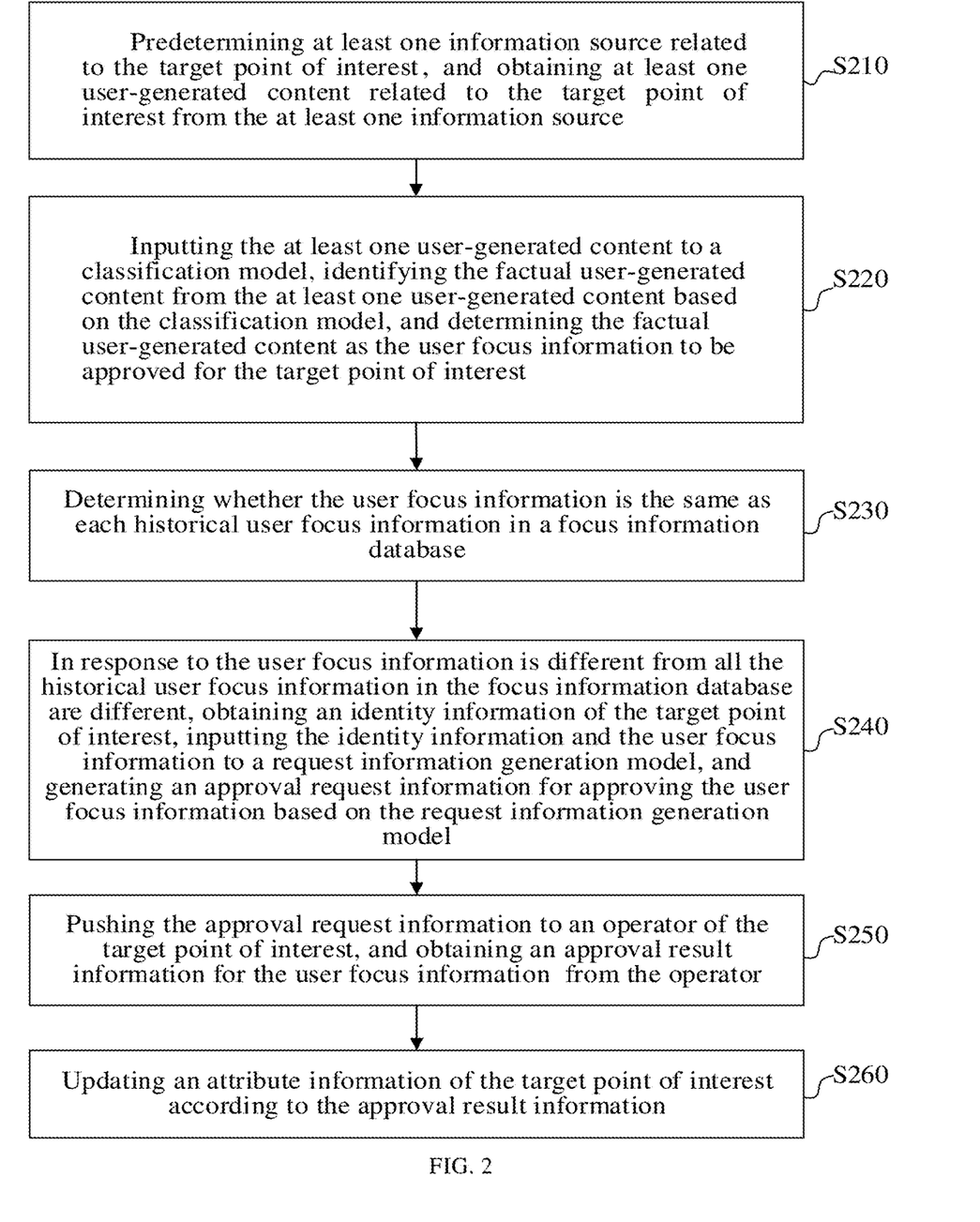
FIG. 2 illustrates a schematic flowchart of another method for updating information of a point of interest provided by the embodiments of the present disclosure.

FIG. 2 illustrates a schematic flowchart of a method for updating information of a point of interest provided by an embodiment of the present disclosure. As shown in FIG. 2, the method may mainly include the following steps:

S210: at least one information source related to a target point of interest is predetermine, and at least one user-generated content related to the target point of interest is obtain from the at least one information source.

Predetermining at least one information source related to the target point of interest may narrow the search scope and improve the efficiency of identifying a user focus information to be approved for the target point of interest. Herein the at least one information source includes map applications, forums, and user search logs, shopping applications, video applications.

S220: at least one user-generated content is input to a classification model, a factual user-generated content is identified from the at least one user-generated content based on the classification model, and the factual user-generated content is determined as the user focus information to be approved for the target point of interest.

In the embodiments of the present disclosure, the user-generated content includes the factual user-generated content and/or a subjective user-generated content, where the factual user-generated content may be used as the user focus information to be approved for the target point of interest. Specifically, the factual user-generated content may include a factual description content or an inquiry content generated by the user for an attribute of the target point of interest, and the subjective user-generated content may include a subjective evaluation content generated by the user for the target point of interest or a description content related to the user. By further refining the categories of user-generated content, the accuracy of the approval result may be effectively improved.

Hereafter restaurant A is taken as an example to introduce several types of user-generated content for restaurant A.

The factual description content generated by user for attribute of restaurant A: "This is a five-star hotel", "Shows are provided during dinner", and "parking is free."

The factual inquiry content generated by user for attribute of restaurant A: "Is pet allowed there?", "Is it Sichuan cuisine or Shandong cuisine".

The subjective evaluation content generated by user for restaurant A: "Food provided by the restaurant is really delicious", "Beautiful environment", "Never come again, what a bad place".

The descriptive content related to user: "I come here often", "I came in when I passed by".

In the embodiments of the present disclosure, the classification model may be any model that may classify the input user-generated content, such as the Ernie model, the GPT model, and the ELMO model, which are not limited here. Based on the classification model, the factual description content or query content generated by the user for the attribute of the target point of interest is identified from at least one user-generated content, and the factual description content or query content generated by the user for the attribute of the target point of interest is determined as the user focus information to be approved for the target point of interest.

The classification model of the embodiments of the present disclosure may preferably adopt the Ernie model, which is a bidirectional language model and possesses context information. Compared with the one-way language GPT model and the simple two-way language ELMO model, the Ernie model has a better recognition effect. Ernie uses Transformer as the feature extractor. Compared with the feature extractor of the RNN series, Transformer may be parallelized and may also capture the dependency of long sequences. The Ernie model uses pre-train+fine-turning training mode and performs pre-training based on a large number of corpus. During the pre-training process, the Ernie model has been able to learn the characteristics of words, syntax, semantics, etc., and only a small amount of data is required for fine-turning to obtain a satisfactory Ernie model. That is, the Ernie model may achieve the training task of classifying user-generated content with a smaller amount of labeled data.

S230: it is determined whether the user focus information is the same as each historical user focus information in the focus information database.

In the embodiments of the present disclosure, a semantic similarity between the user focus information and the historical user focus information may be calculated, and it may be determined whether the user focus information is the same as the historical user focus information based on the semantic similarity. Optionally, a semantic similarity model may be used to calculate the semantic similarity between the user focus information and the historical user focus information and it is determined whether the user focus information is the same as the historical user focus information The semantic similarity model may be any type that may calculate the semantic similarity between the user focus information and the historical user focus information, and there is no limitation here.

For example, according to the embodiments of the present disclosure, the semantic similarity model based on Ernie may be used. The user focus information and each historical user focus information in the focus information database are input to the semantic similarity model, and the similarity between user focus information and each historical user focus information in the focus information database is calculated based on the semantic similarity model. For each historical user focus information in the focus information database, it is determined that the user focus information is different from a historical user focus information in response to a similarity between the user focus information and the historical user focus information is not greater than a preset similarity threshold. It may be understood that it is determined that the user focus information is the same as a historical user focus information in response to a similarity between the user focus information and the historical user focus information is greater than the preset similarity threshold. In addition, the similarity threshold may be set as desired in practice. Through the above steps, it may be determined whether the user focus information is the same as each historical user focus information in the focus information database.

For example, the user focus information of the identified target point of interest is "There are free parking spaces", a historical user focus information in the focus information database is "Free parking is available", and the similarity threshold is 0.9. "There are free parking spaces" and "Free parking is available" are input to the semantic similarity model, and the similarity calculated by the semantic similarity model is 0.95, so it may be confirmed that "There are free parking spaces" is the same as "Free parking is available".

S240: in response to the user focus information is different from all the historical user focus information in the focus information database, an identity information of the target point of interest is obtained, the identity information and the user focus information are input to a request information generation model, and an approval request information for approving the user focus information is generated based on the request information generation model.

The request information generation model may be any model that may complete the task of generating the approval request information, and there is no restriction here. For example, the embodiments of the present disclosure may use ERNIE-GEN to generate the approval request information. ERNIE-GEN is a pre-training and fine-tuning framework for generation tasks. For the first time, span-by-span generation task is introduced in the pre-training stage, so that the model may generate a semantically-complete span at each step. In pre-training and fine-tuning, an infilling generation mechanism and a noise-aware mechanism are used to alleviate the problem of exposure bias. In addition, ERNIE-GEN employs multi-span-multi-granularity target text sampling strategy enhances the relevance of source text and target text, and strengthens the interaction between encoder and decoder.

The following briefly introduces the training process of the request information generation model:

For the training data of the request information generation model, the pre-train+fine-turning method may be used. Therefore, the required amount of the training data is not large. In order to ensure that the training data is sufficiently accurate, the training set and the test set data may be generated by manual labeling. The training data may be generated through the identity information of the point of interest and the user focus information, where the identity information may be information that represents the identity of the point of interest, such as the name of the point of interest. Taking the shopping mall B being the point of interest and the user focus information being "This shopping mall provides shows" as an example, the training data may be: "Shopping mall B | Shopping mall | This shopping mall provides shows | I | Do you provide shows?". The model is trained with a preset amount of training data to obtain a request information generation model that may accurately generate the approval request information. By using the request information generation model, it is possible to generate the approval request information that includes a complete set of speeches, and perform a complete communication with the operator based on the complete set of speeches.

Optionally, the approval request information in the embodiments of the present disclosure may include a speech to confirm the identity of the other party, a speech to express own identity, and a speech to approve the user focus information. Taking the target point of interest being Restaurant A and the user focus information being "This restaurant provides free parking" as an example, the approval request information generated by the request information generation model may include the following speeches:

"Hello, is this Restaurant AT?" [speech to confirm the identity of the other party]

"I am a smart customer service for you, and I want to help you maintain the detailed information of your restaurant" [speech to express own identity]

"Do you have free parking available in your restaurant?" [a speech to approve the user focus information]

S250: the approval request information is pushed to an operator of the target point of interest, and an approval result information for the user focus information is obtained from the operator.

In the embodiments of the present disclosure, the approval request information may be pushed to the operator of the target point of interest (such as the owner of a restaurant) through a variety of communication methods. For example, the approval request information may be pushed to the operator of the target point of interest via telephone call, SMS, email, or instant messaging software, and the approval result information for the user focus interest information may be obtained based on the operator's feedback for the approval request information. For example, an intelligent voice robot may be used to communicate with the operator of the target point of interest by telephone call, a corresponding voice is sent based on the approval request information generated in the above steps, and the approval result information for the user focus information is generated based on the answer result of the operator.

For example, after asking "Is free parking available your restaurant?", if the operator's answer is yes, the approval result information may be "Free parking is available at the restaurant"; and if the operator's answer is no, the approval result information is "Free parking is not available at the restaurant".

S260: an attribute information of the target point of interest is updated according to the approval result information.

In the embodiments of the present disclosure, the approval result information may be added as the new attribute information of the target point of interest, and stored in association with the target point of interest.

Figure 3:
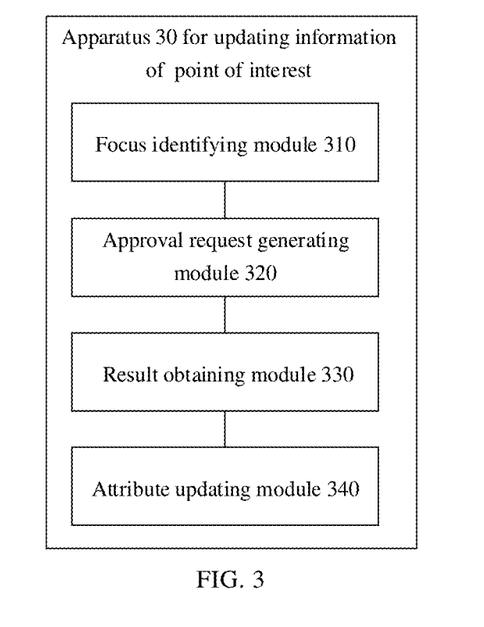
FIG. 3 illustrates a first schematic structural diagram of an apparatus for updating information of a point of interest provided by the embodiments of the present disclosure.
Figure 4:
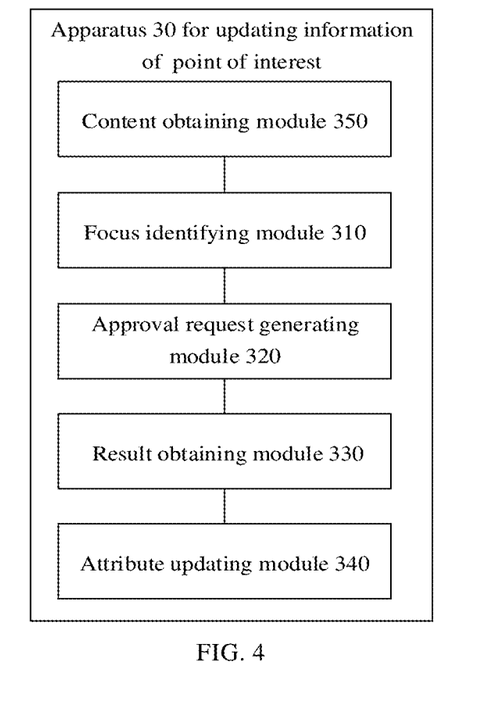
FIG. 4 illustrates a second structural diagram of the apparatus for updating information of a point of interest provided by the embodiments of the present disclosure.

Based on the same principle as the above-mentioned method for updating in formation of the point of interest, FIG. 3 illustrates a first schematic structural diagram of an apparatus for updating information of a point of interest provided by the embodiments of the present disclosure, and FIG. 4 illustrates a second structural diagram of the apparatus for updating information of a point of interest provided by the embodiments of the present disclosure. As shown in FIG. 3, the apparatus 30 for updating information of the point of interest includes a focus identifying module 310, an approval request generating module 320, a result obtaining module 330 and an attribute updating module 340.

The focus identifying module 310 is configured to identify a user focus information to be approved for a target point of interest from at least one user-generated content.

The approval request generating module 320 is configured to construct an approval request information for approving the user focus information.

The result obtaining module 330 is configured to push the approval request information to an operator of the target point of interest and to obtain an approval result information for the user focus information from the operator.

The attribute updating module 340 is configured to update an attribute information of the target point of interest according to the approval result information.

The apparatus for updating information of the point of interest provided by the embodiments of the present disclosure may accurately identify the user focus information that the user cares about for the target point of interest in the user-generated content on the Internet, and may automatically contact the operator of the target point of interest to approve and update the user focus information. In this way, it is possible to effectively construct various personalized attribute information of the target point of interest, such that the various attribute information about the target point of interest may be fully understood by the user and the user experience may be improved.

In the embodiments of the present disclosure, the user-generated content includes a factual user-generated content and/or a subjective user-generated content. The focus identifying module 310, when configured to identify the user focus information to be approved for the target point of interest from at least one user-generated content, is specifically configured to:
  input the at least one user-generated content to a classification model and identify the factual user-generated content from the at least one user-generated content based on the classification model; and
  determine the factual user-generated content as the user focus information to be approved for the target point of interest.

In the embodiments of the present disclosure, the factual user-generated content includes a factual description content or a factual inquiry content generated by a user for an attribute of the target point of interest; and/or
  the subjective user-generated content includes a subjective evaluation content generated by the user for the target point of interest or a description content related to the user.

In the embodiments of the present disclosure, as shown in FIG. 4, the apparatus 30 for updating information of the point of interest further includes further a content obtaining module 350. The content obtaining module 350 is configured to:
  determine at least one information source related to the target point of interest, wherein the at least one information source includes a map application, a forum, a user search log, a shopping application and a video application; and
  obtain at least one user-generated content related to the target point of interest from the at least one information source.

In the embodiments of the present disclosure, the approval request generating module 320, when configured to construct the approval request information for approving the user focus information, is specifically configured to:
  determine whether the user focus information is the same as each historical user focus information in a focus information database; and
  construct the approval request information for approving the user focus information in response to the user focus information is different from all the historical user focus information in the focus information database.

In the embodiments of the present disclosure, the approval request generating module 320 determines whether the user focus information is the same as each historical user focus information in the focus information database by following steps:
  inputting the user focus information and each historical user focus information in the focus information database to a semantic similarity model and calculating a similarity between the user focus information and each historical user focus information in the focus information database based on the semantic similarity model; and
  for each historical user focus information in the focus information database, determining that the user focus information is different from the historical user focus information in response to a similarity between the user focus information and the historical user focus information is not greater than a preset similarity threshold.

In the embodiments of the present disclosure, the approval request generating module 320, when configured to construct the approval request information for approving the user focus information, is specifically configured to:
  obtain an identity information of the target point of interest; and
  input the identity information and the user focus information to a request information generation model and generate the approval request information for approving the user focus information based on the request information generation model.

It may be understood that the above-mentioned modules of the apparatus for updating information of the point of interest in the embodiments of the present disclosure have the functions of implementing the corresponding steps of the above-mentioned method. The functions may be implemented by hardware, or by hardware executing corresponding software. The hardware or software includes one or more modules corresponding to the above-mentioned functions. The above-mentioned modules may be software and/or hardware, and each of the above-mentioned modules may be implemented separately or integrated with multiple modules. The detailed description of the functions of each module of the above-mentioned apparatus may refer to the corresponding description of the above-mentioned method, which will not be repeated here.

It should be noted that the collecting, storing, using, processing, transmitting, providing, and disclosing etc. of the user personal information involved in the present disclosure are in compliance with relevant laws and regulations, are protected by essential security measures, and do not violate public order and good customs. According to the present disclosure, personal information of the user is acquired or collected after such acquirement or collection is authorized or permitted by the user.

According to the embodiments of the present disclosure, the present disclosure also provides an electronic device, a readable storage medium, and a computer program product.

Figure 5:
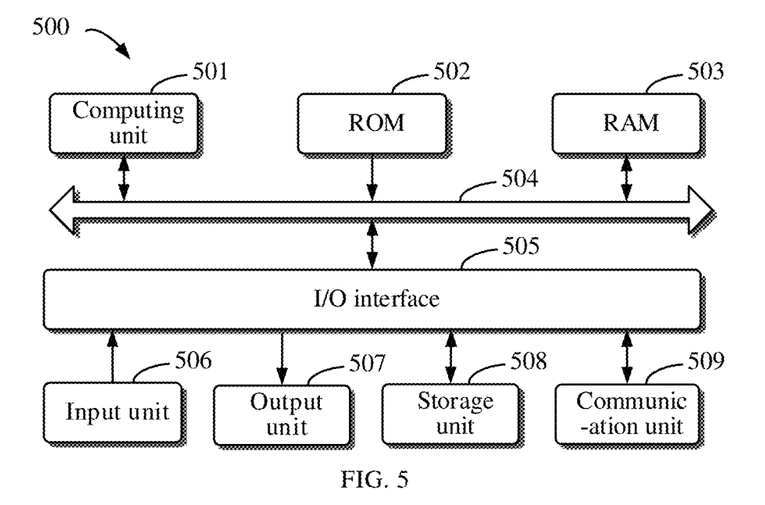
FIG. 5 illustrates a schematic block diagram of an example electronic device that may be used to implement the method for updating information of a point of interest according to the embodiments of the present disclosure.

FIG. 5 illustrates a schematic block diagram of an example electronic device that may be used to implement the method for updating information of a point of interest according to the embodiments of the present disclosure. The electronic device is intended to represent various forms of digital computers, such as laptop computers, desktop computers, workstations, personal digital assistants, servers, blade servers, mainframe computers and other suitable computers. The electronic device may also represent various forms of mobile devices, such as personal digital processing, cellular phones, smart phones, wearable devices and other similar computing devices. The components shown herein, their connections and relationships, and their functions are merely examples, and are not intended to limit the implementation of the present disclosure described and/or required herein.

As shown in FIG. 5, the apparatus 500 includes a computing unit 501, which may execute various appropriate actions and processing according to a computer program stored in a read only memory (ROM) 502 or a computer program loaded from a storage unit 508 into a random access memory (RAM) 503. Various programs and data required for the operation of the apparatus 500 may also be stored in the RAM 503. The computing unit 501, the ROM 502 and the RAM 503 are connected to each other through a bus 504. An input/output (I/O) interface 505 is also connected to the bus 504.

The I/O interface 505 is connected to a plurality of components of the apparatus 500, including: an input unit 506, such as a keyboard, a mouse, etc.; an output unit 507, such as various types of displays, speakers, etc.; a storage unit 508, such as a magnetic disk, an optical disk, etc.; and a communication unit 509, such as a network card, a modem, a wireless communication transceiver, etc. The communication unit 509 allows the apparatus 500 to exchange information/data with other devices through the computer network such as the Internet and/or various telecommunication networks.

The computing unit 501 may be various general-purpose and/or special-purpose processing components with processing and computing capabilities. Some examples of computing unit 501 include, but are not limited to, central processing unit (CPU), graphics processing unit (GPU), various dedicated artificial intelligence (AI) computing chips, various computing units that run machine learning model algorithms, digital signal processing DSP and any appropriate processor, controller, microcontroller, etc. The computing unit 501 executes the various methods and processing described above, such as the method for updating information of the point of interest. For example, in some embodiments, the method for updating information of the point of interest may be implemented as computer software programs, which are tangibly contained in the machine-readable medium, such as the storage unit 508. In some embodiments, part or all of the computer program may be loaded and/or installed on the apparatus 500 via the ROM 502 and/or the communication unit 509. When the computer program is loaded into the RAM 503 and executed by the computing unit 501, one or more steps of the method for updating information of the point of interest described above may be executed. Alternatively, in other embodiments, the computing unit 501 may be configured to execute the method for updating information of the point of interest in any other suitable manner (for example, by means of firmware).

Various implementations of the systems and technologies described in the present disclosure may be implemented in digital electronic circuit systems, integrated circuit systems, field programmable gate arrays (FPGA), application specific integrated circuits (ASIC), application-specific standard products (ASSP), system-on-chip SOC, load programmable logic device (CPLD), computer hardware, firmware, software and/or their combination. The various implementations may include: being implemented in one or more computer programs, the one or more computer programs may be executed and/or interpreted on a programmable system including at least one programmable processor, the programmable processor may be a dedicated or general programmable processor. The programmable processor may receive data and instructions from a storage system, at least one input device and at least one output device, and the programmable processor transmit data and instructions to the storage system, the at least one input device and the at least one output device.

The program code used to implement the method of the present disclosure may be written in any combination of one or more programming languages. The program codes may be provided to the processors or controllers of general-purpose computers, special-purpose computers or other programmable data processing devices, so that the program code enables the functions/operations specified in the flowcharts and/or block diagrams to be implemented when the program code executed by a processor or controller. The program code may be executed entirely on the machine, partly executed on the machine, partly executed on the machine and partly executed on the remote machine as an independent software package, or entirely executed on the remote machine or server.

In the context of the present disclosure, the machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device or any suitable combination of the above-mentioned content.

In order to provide interaction with users, the systems and techniques described here may be implemented on a computer, the computer includes: a display device (for example, a CRT (cathode ray tube) or LCD (liquid crystal display) monitor) for displaying information to the user; and a keyboard and a pointing device (for example, a mouse or trackball). The user may provide input to the computer through the keyboard and the pointing device. Other types of devices may also be used to provide interaction with users. For example, the feedback provided to the user may be any form of sensory feedback (for example, visual feedback, auditory feedback or tactile feedback); and any form (including sound input, voice input, or tactile input) may be used to receive input from the user.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation of the system and technology described herein), or in a computing system including any combination of such back-end components, middleware components or front-end components. The components of the system may be connected to each other through any form or medium of digital data communication (for example, a communication network). Examples of communication networks include: local area network (LAN), wide area network (WAN) and the Internet.

The computer system may include a client and a server. The client and the server are generally far away from each other and usually interact through the communication network. The relationship between the client and the server is generated by computer programs that run on the corresponding computers and have a client-server relationship with each other.

It should be understood that the various forms of processes shown above may be used to reorder, add or delete steps. For example, the steps described in the present disclosure may be executed in parallel, sequentially or in a different order, as long as the desired result of the technical solution disclosed in the present disclosure may be achieved, which is not limited herein.

The above-mentioned specific implementations do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for updating information of a point of interest, comprising:
   identifying a user focus information to be approved for a target point of interest from at least one user-generated content;
   constructing an approval request information for approving the user focus information;
   pushing the approval request information to an operator of the target point of interest and obtaining an approval result information for the user focus information from the operator; and
   updating an attribute information of the target point of interest according to the approval result information, wherein
   the identifying a user focus information to be approved for a target point of interest from at least one user-generated content comprises: inputting the at least one user-generated content to a classification model and classifying the at least one user-generated content by the classification model to determine if each of the at least one user-generated content is a factual user-generated content or a subjective user-generated content; and determining the factual user-generated content among the at least one user-generated content as the user focus information to be approved for the target point of interest;
   the factual user-generated content comprises a factual description content or a factual inquiry content generated by a user for an attribute of the target point of interest, and the subjective user-generated content comprises a subjective evaluation content generated by the user for the target point of interest or a description content related to the user; and
   the constructing an approval request information for approving the user focus information comprises: obtaining an identity information of the target point of interest; and inputting the identity information and the user focus information to a request information generation model and generating the approval request information for approving the user focus information based on the request information generation model.

2. The method according to claim 1, further comprising: before the identifying a user focus information to be approved for a target point of interest from at least one user-generated content,
   determining at least one information source related to the target point of interest, wherein the at least one information source comprises a map application, a forum, a user search log, a shopping application and a video application; and
   obtaining at least one user-generated content related to the target point of interest from the at least one information source.

3. The method according to claim 1, wherein the constructing an approval request information for approving the user focus information comprises:
   determining whether the user focus information is the same as each historical user focus information in a focus information database; and
   constructing the approval request information for approving the user focus information in response to the user focus information is different from all the historical user focus information in the focus information database.

4. The method according to claim 3, wherein the determining whether the user focus information of is the same as each historical user focus information in the focus information database comprises:
   inputting the user focus information and each historical user focus information in the focus information database to a semantic similarity model and calculating a similarity between the user focus information and each historical user focus information in the focus information database based on the semantic similarity model; and
   for each historical user focus information in the focus information database, determining that the user focus information is different from the historical user focus information in response to a similarity between the user focus information and the historical user focus information is not greater than a preset similarity threshold.

5. An electronic device, comprising:
   at least one processor; and
   a memory communicatively connected with the at least one processor;
   wherein the memory stores instructions executable by the at least one processor, and the instructions, when executed by the at least one processor, cause the at least one processor to;

identify a user focus information to be approved for a target point of interest from at least one user-generated content;

construct an approval request information for approving the user focus information;

push the approval request information to an operator of the target point of interest and obtaining an approval result information for the user focus information from the operator; and update an attribute information of the target point of interest according to the approval result information, wherein the at least one processor is further configured to: input the at least one user-generated content to a classification model and classify the at least one user-generated content by the classification model to determine if each of the at least one user-generated content is a factual user-generated content or a subjective user-generated content; and determine the factual user-generated content among the at least one user-generated content as the user focus information to be approved for the target point of interest, the factual user-generated content comprises a factual description content or a factual inquiry content generated by a user for an attribute of the target point of interest, and the subjective user-generated content comprises a subjective evaluation content generated by the user for the target point of interest or a description content related to the user; and the at least one processor is further configured to: obtain an identity information of the target point of interest; and inputting the identity information and the user focus information to a request information generation model and generate the approval request information for approving the user focus information based on the request information generation model.

6. A non-transitory computer-readable storage medium storing computer instructions, wherein the computer instructions are configured to cause the computer to;

identify a user focus information to be approved for a target point of interest from at least one user-generated content;

construct an approval request information for approving the user focus information;

push the approval request information to an operator of the target point of interest and obtaining an approval result information for the user focus information from the operator; and update an attribute information of the target point of interest according to the approval result information, wherein the computer instructions are further configured to cause the computer to: input the at least one user-generated content to a classification model and classify the at least one user-generated content by the classification model to determine if each of the at least one user-generated content is a factual user-generated content or a subjective user-generated content; and determine the factual user-generated content among the at least one user-generated content as the user focus information to be approved for the target point of interest;

the factual user-generated content comprises a factual description content or a factual inquiry content generated by a user for an attribute of the target point of interest, and the subjective user-generated content comprises a subjective evaluation content generated by the user for the target point of interest or a description content related to the user; and the computer instructions are further configured to cause the computer to: obtain an identity information of the target point of interest; and inputting the identity information and the user focus information to a request information generation model and generate the approval request information for approving the user focus information based on the request information generation model.

* * * * *